United States Patent
Yang

(10) Patent No.: US 11,074,026 B2
(45) Date of Patent: Jul. 27, 2021

(54) DISPLAY APPARATUS, MULTI DISPLAY APPARATUS, AND IMAGE DISPLAY METHOD USING THE MULTI DISPLAY APPARATUS

(71) Applicant: SAMSUNG ELECTRONICS CO., LTD., Suwon-si (KR)

(72) Inventor: Joon-hyun Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/181,517

(22) Filed: Nov. 6, 2018

(65) Prior Publication Data

US 2019/0087146 A1 Mar. 21, 2019

Related U.S. Application Data

(63) Continuation of application No. 15/381,243, filed on Dec. 16, 2016, now Pat. No. 10,152,292.

(30) Foreign Application Priority Data

Jan. 4, 2016 (KR) .................. KR10-2016-0000421

(51) Int. Cl.
 *G06F 3/14* (2006.01)
 *H04N 21/431* (2011.01)
(52) U.S. Cl.
 CPC .......... *G06F 3/1446* (2013.01); *G06F 3/1423* (2013.01); *H04N 21/4316* (2013.01);
 (Continued)
(58) Field of Classification Search
 CPC .................................................. G06F 3/1446
 See application file for complete search history.

(56) References Cited

U.S. PATENT DOCUMENTS 9,134,773 B2 9/2015 Hall
9,696,959 B2 7/2017 Fu
(Continued)

FOREIGN PATENT DOCUMENTS

CN 101060618 A 10/2007
CN 101087433 A 12/2007
(Continued)

OTHER PUBLICATIONS

U.S. Appl. No. 15/381,243, filed Dec. 16, 2016; Yang.
(Continued)

*Primary Examiner* — Gustavo Polo
(74) *Attorney, Agent, or Firm* — Nixon & Vanderhye P.C.

(57) ABSTRACT

A display apparatus capable of configuring one multi display apparatus by combining a plurality of display apparatuses, a multi display apparatus, and an image display method using the multi display apparatus are provided. The display apparatus for configuring the multi display apparatus by making sides of a plurality of display apparatuses be opposite to each other includes an input interface configured to receive an image signal; wireless communicators comprising wireless communication circuitry provided at four sides of the display apparatus; a controller configured to set a reference display apparatus based on wireless communication through the wireless communicators, to set coordinates of the display apparatus, to determine a size of the multi display apparatus, and to select an area corresponding to the coordinates of the display apparatus from the image signal; and a display configured to display the area selected by the image selector.

16 Claims, 11 Drawing Sheets

(52) U.S. Cl.
CPC ..... *G09G 2356/00* (2013.01); *G09G 2370/16* (2013.01); *G09G 2370/18* (2013.01)

(56) References Cited

U.S. PATENT DOCUMENTS

| | | | |
|---|---|---|---|
| 10,169,534 | B2 | 1/2019 | Day et al. |
| 2012/0204404 | A1 | 8/2012 | Kim et al. |
| 2014/0104139 | A1 | 4/2014 | Buchner |
| 2014/0232616 | A1 | 8/2014 | Drake et al. |
| 2015/0084837 | A1 | 3/2015 | Mese |
| 2015/0109340 | A1 | 4/2015 | Scherm et al. |
| 2015/0138252 | A1 | 5/2015 | Okano et al. |
| 2015/0243251 | A1 | 8/2015 | Ohnishi |
| 2015/0268918 | A1* | 9/2015 | Fu .................... G09G 5/003 345/661 |

FOREIGN PATENT DOCUMENTS

| | | |
|---|---|---|
| CN | 103260057 A | 8/2013 |
| CN | 103297707 A | 9/2013 |
| CN | 103645874 A | 3/2014 |
| CN | 103873937 A | 6/2014 |
| CN | 104025182 A | 9/2014 |
| CN | 104510488 A | 4/2015 |
| CN | 204741569 | 11/2015 |
| JP | 2011-257540 | 12/2011 |
| KR | 10-2011-0017497 | 2/2011 |
| KR | 10-2014-0114201 | 9/2014 |
| TW | 201537554 A | 10/2015 |
| WO | 2012/044724 | 4/2012 |
| WO | 2015/016569 | 2/2015 |

OTHER PUBLICATIONS

Extended Search Report dated May 16, 2016 in counterpart European Patent Application No. 16205473.8.
Chinese Office Action dated Apr. 22, 2020 for Chinese Application No. 201710003767.3.
Chinese Office Action dated Nov. 19, 2020 for CN Application No. 201710003767.3.

* cited by examiner

DISPLAY APPARATUS, MULTI DISPLAY APPARATUS, AND IMAGE DISPLAY METHOD USING THE MULTI DISPLAY APPARATUS

CROSS-REFERENCE TO RELATED APPLICATION

This application is a continuation of U.S. application Ser. No. 15/381,243, filed Dec. 16, 2016, which claims priority to KR 10-2016-0000421, filed Jan. 4, 2016, the entire contents of each of which are hereby incorporated herein by reference.

BACKGROUND

1. Field

The present disclosure relates generally to display apparatuses, multi display apparatuses, and image display methods using the multi display apparatuses.

2. Description of Related Art

A display apparatus is an apparatus having a function of displaying an image that a user may view. For example, the display apparatus has conventionally provided a function of uni-directionally receiving a broadcast signal mainly sent from a broadcast station and displaying a broadcast image. However, the display apparatus currently provides a function of outputting not only a broadcast signal received from a broadcast station but also various image contents.

As display apparatuses have developed, they may be utilized as a video wall providing advertisements and guide information not only at home but also in a control room of a police station, a fire station, a weather station, etc., a lobby of a shopping mall, etc. Thus, interest in a method of efficiently displaying an image through a plurality of display apparatuses has also increased.

As a diagonal dimension of the display apparatus increases, a price of the display apparatus greatly increases. Thus, a large sized display apparatus is a big financial burden to a customer. Thus, a method of configuring a large sized display apparatus by using a plurality of small sized display apparatuses is used.

SUMMARY

Display apparatuses capable of being configured into one multi display apparatus by combining a plurality of display apparatuses, multi display apparatuses, and image display methods using the multi display apparatuses are provided.

Additional aspects will be set forth in part in the description which follows and, in part, will be apparent from the description.

According to an example aspect of an example embodiment, a display apparatus for configuring a multi display apparatus by making sides of a plurality of display apparatuses be opposite to each other includes: an input interface comprising input circuitry configured to receive an image signal; wireless communicators comprising communication circuitry provided at four sides of the display apparatus; a controller comprising an operator configured to set a reference display apparatus based on wireless communication through the wireless communicators, to set coordinates of the display apparatus, and to determine a size of the multi display apparatus; an image selector comprising image selecting circuitry configured to select an area corresponding to the coordinates of the display apparatus from the image signal; and a display configured to display the area selected by the image selector.

Each of the wireless communicators may include an infrared sensor.

Each of the wireless communicators may include a transmitter and a receiver.

The display apparatus may further include: an image quality processor configured to adjust an image quality based on a characteristic of the display apparatus.

The display apparatus may further include: an output interface comprising output circuitry configured to transmit the image signal to another display apparatus opposite the sides of the display apparatus.

The operator may set a display apparatus having a lowest intrinsic ID number among the plurality of display apparatuses as the reference display apparatus.

The operator may set coordinates of the display apparatus using a coordinate system of a horizontal direction and a vertical direction with respect to the reference display apparatus.

The operator may determine the size of the multi display apparatus from coordinates of the plurality of display apparatuses.

According to an aspect of another example embodiment, an image display method performed using a multi display apparatus configured by arranging sides of a plurality of display apparatuses opposite to each other includes: setting a reference display apparatus through wireless communication between wireless communicators comprising communication circuitry provided at four sides of each of the plurality of display apparatuses; setting coordinates of each of the plurality of display apparatuses with respect to the reference display apparatus; determining a size of the multi display apparatus; selecting an area corresponding to the coordinates from an image signal input to each of the plurality of display apparatuses; and displaying the area on each of the plurality of display apparatuses.

The method may further include: after setting the reference display apparatus, notifying location information of the reference display apparatus from the reference display apparatus to the plurality of display apparatuses.

The method may further include: adjusting an image quality based on characteristics of the plurality of display apparatuses.

The wireless communicators may perform wireless communication by transmitting and receiving data using infrared sensors.

The setting of the reference display apparatus may include: setting a display apparatus having a lowest intrinsic ID number among the plurality of display apparatuses as the reference display apparatus.

The setting of the coordinates of each of the plurality of display apparatuses may include: setting the coordinates based on location information of a first display apparatus transmitted through wireless communication and a side direction in which wireless communicators of a second display apparatus that receives the location information of the first display apparatus are arranged.

The determining of the size of the multi display apparatus may include: determining the size using a maximum value and a minimum value of horizontal direction coordinates of the plurality of display apparatuses and a maximum value and a minimum value of vertical direction coordinates of the plurality of display apparatuses, with respect to the reference display apparatus.

According to an aspect of another example embodiment, an image display method performed using a third multi display apparatus configured by arranging sides of a first multi display apparatus and a second multi display apparatus opposite to each other includes: setting a reference display apparatus of the third multi display apparatus through wireless communication between wireless communicators provided at sides of the first multi display apparatus and the second multi display apparatus; setting coordinates of each of a plurality of display apparatuses included in the third multi display apparatus with respect to the reference display apparatus; determining a size of the third multi display apparatus from the coordinates of each of the plurality of display apparatuses; selecting an area corresponding to the coordinates from an image signal input to each of the plurality of display apparatuses; and displaying the area on each of the plurality of display apparatuses.

The setting of the reference display apparatus may include: setting the reference display apparatus of the third multi display apparatus by comparing a first reference display apparatus of the first multi display apparatus and a second reference display apparatus of the second multi display apparatus.

A display apparatus having a lower intrinsic ID number between the first multi display apparatus and the second multi display apparatus may be set as the reference display apparatus.

The method may further include: adjusting an image quality based on characteristics of the plurality of display apparatuses.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
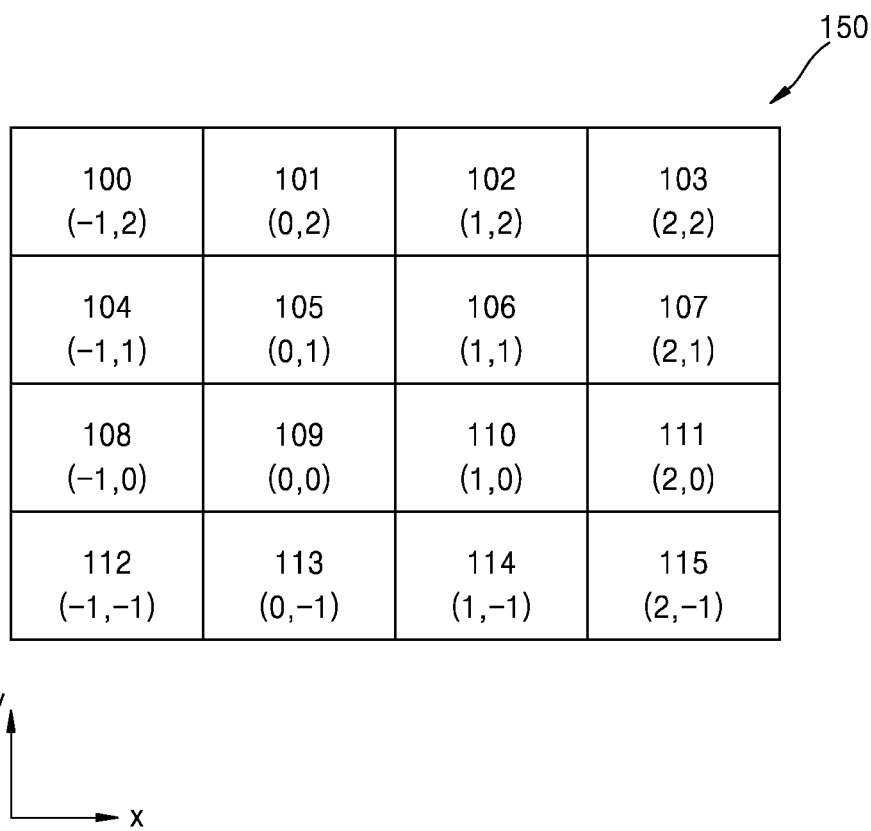
FIG. 1 is a diagram illustrating an example multi display apparatus according to an example embodiment.
Figure 1:

Reference will now be made in greater detail to various example embodiments, examples of which are illustrated in the accompanying drawings, wherein like reference numerals refer to like elements throughout. In this regard, the present embodiments may have different forms and should not be construed as being limited to the descriptions set forth herein. Accordingly, the example embodiments are merely described below, by referring to the figures, to explain aspects thereof. In the drawings, portions irrelevant to the description are omitted for convenience of explanation. Like numerals refer to like elements throughout the description of the figures.

Throughout the specification, it will be understood that when a unit is referred to as being "connected" to another element, it may be "directly connected" to the other element or "electrically connected" to the other element in a state in which intervening elements are present. In addition, it will be understood that when a unit is referred to as "comprising" another element, it does not preclude the possibility that one or more other elements may exist or may be added.

FIG. 1 is a diagram illustrating an example multi display apparatus 150 according to an example embodiment.

Referring to FIG. 1, a length direction and a width direction of each of display apparatuses 100 through 115 are respectively referred to as an x axis direction (a horizontal direction) and a y axis direction (a vertical direction) and are applied to the drawings below.

The multi display apparatus 150 may include the plurality of display apparatuses 100 through 115 in a grid type arrangement of, for example, 4 columns and 4 rows. The plurality of display apparatuses 100 through 115 may output one image or a plurality of images.

Coordinates of each of the display apparatuses 100 through 115 of FIG. 1 indicate a location of each of the display apparatuses 100 through 115 using a coordinate system of the x axis direction (the horizontal direction) and the y axis direction (the vertical direction) with respect to a reference display apparatus, such as, for example, display apparatus 109. (x,y)=(0,0) may be a coordinate value of the reference display apparatus 109. The coordinates of each of the display apparatuses 100 through 115 may be set with respect to (x,y)=(0,0). A method of setting the reference display apparatus 109 will be described in greater detail below.

The multi display apparatus 150 is not limited to the grid type arrangement of 4 columns and 4 rows of FIG. 1 and may be configured in various arrangement combinations.

A module type display of a grid type arrangement is described as an example of a display apparatus of an embodiment but the present disclosure is not limited thereto. A light emitting diode (LED) display, a large format display (LFD), a digital signage, a television (TV), a monitor, or a display of a mobile terminal may also be used as the display apparatus according to embodiments.

Figure 2A:
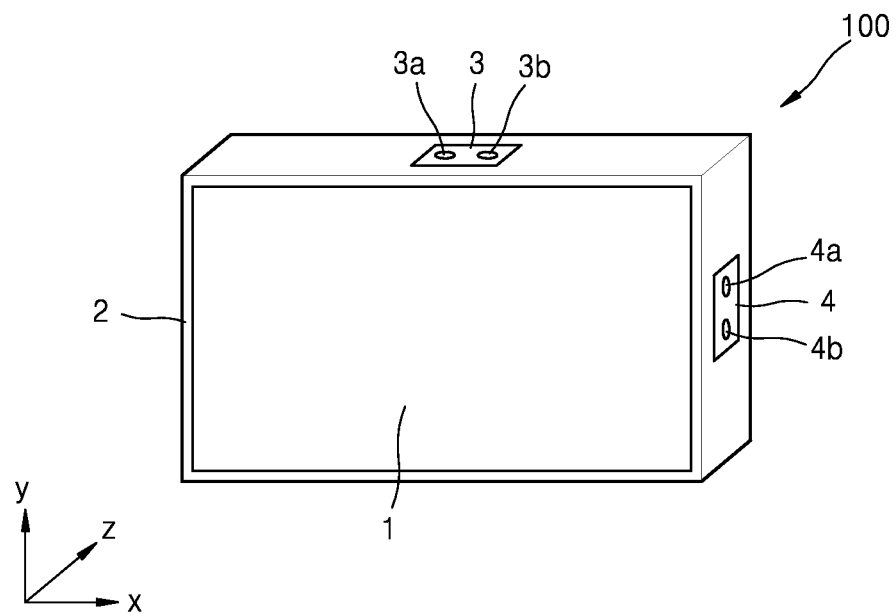
FIGS. 2A and 2B are perspective views of an example display apparatus according to an example embodiment.
Figure 2B:
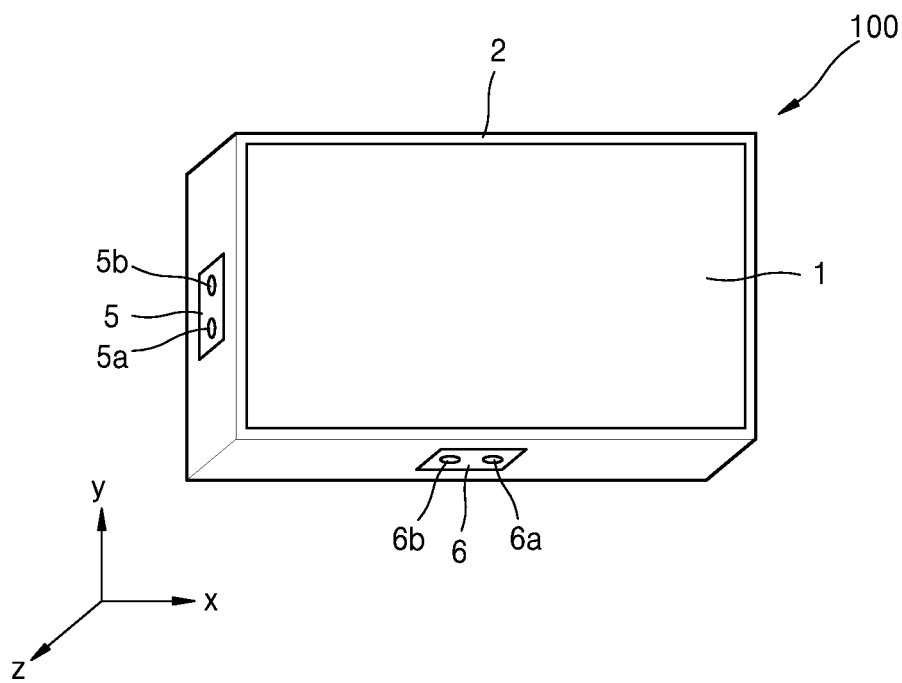

FIGS. 2A and 2B are perspective views of the display apparatus 100 according to an example embodiment.

Referring to FIGS. 2A and 2B, the display apparatus 100 is shown among the plurality of display apparatuses 100 through 115, and the other plurality of display apparatuses 101 through 115 may be the same.

The display apparatus 100 may include a display 1, a case 2, and wireless communicators 3, 4, 5, and 6 each including various wireless communication circuitry.

The display 1 may include a display panel (not shown) and a display controller (not shown). For example, the display 1 may display one area of an input image signal using a liquid crystal display (LCD) technique, an organic light emitting diode (OLED) technique, a plasma display panel (PDP) technique, or a vacuum fluorescent display (VFD) technique, or the like, but is not limited thereto.

The case 2 may be provided to substantially surround the display 1 and may absorb shock applied to the display 1.

The wireless communicators 3, 4, 5, and 6 may be provided at four sides of the display apparatus 100 and may, for example, be arranged in center portions of the four sides. The wireless communicators 3, 4, 5, and 6 may transmit and receive data to and from another display apparatus opposite to sides of the display apparatus 100 through wireless communication.

The wireless communicators 3, 4, 5, and 6 may include various wireless communication circuitry, such as, for example, and without limitation, infrared sensors and may apply an infrared communication standard of the Infrared Data Association (IRDA). However, the present disclosure is not limited thereto. The wireless communicators 3, 4, 5, and 6 may also apply a wireless communication standard relating to Radio Frequency Identification (RFID) or various IEEE802 based near/far wireless communication standards among may other wireless communication techniques.

The wireless communicators 3, 4, 5, and 6 may respectively include sets of transmitters 3a, 4a, 5a, and 6a and receivers 3b, 4b, 5b, and 6b. The transmitter 3a and the receiver 3b of the wireless communicator 3 located at an upper side of the display apparatus 100 may be opposite to the transmitter 6a and the receiver 6b of the wireless communicator 6 located at a lower side of the display apparatus 100. The transmitter 5a and the receiver 5b of the wireless communicator 5 located at a left side of the display apparatus 100 may also be opposite to the transmitter 4a and the receiver 4b of the wireless communicator 4 located at a right side of the display apparatus 100. As described above, locations of the transmitters 3a, 4a, 5a, and 6a and the receivers 3b, 4b, 5b, and 6b of the wireless communicators 3, 4, 5, and 6 may be opposite to each other, and thus the transmitters 3a, 4a, 5a, and 6a and the receivers 3b, 4b, 5b, and 6b, which are of the wireless communicators 3, 4, 5, and 6 that are opposite to each other in the multi display apparatus 150 of FIG. 1, may be opposite to each other, and accordingly wireless communication may be performed.

Figure 3:
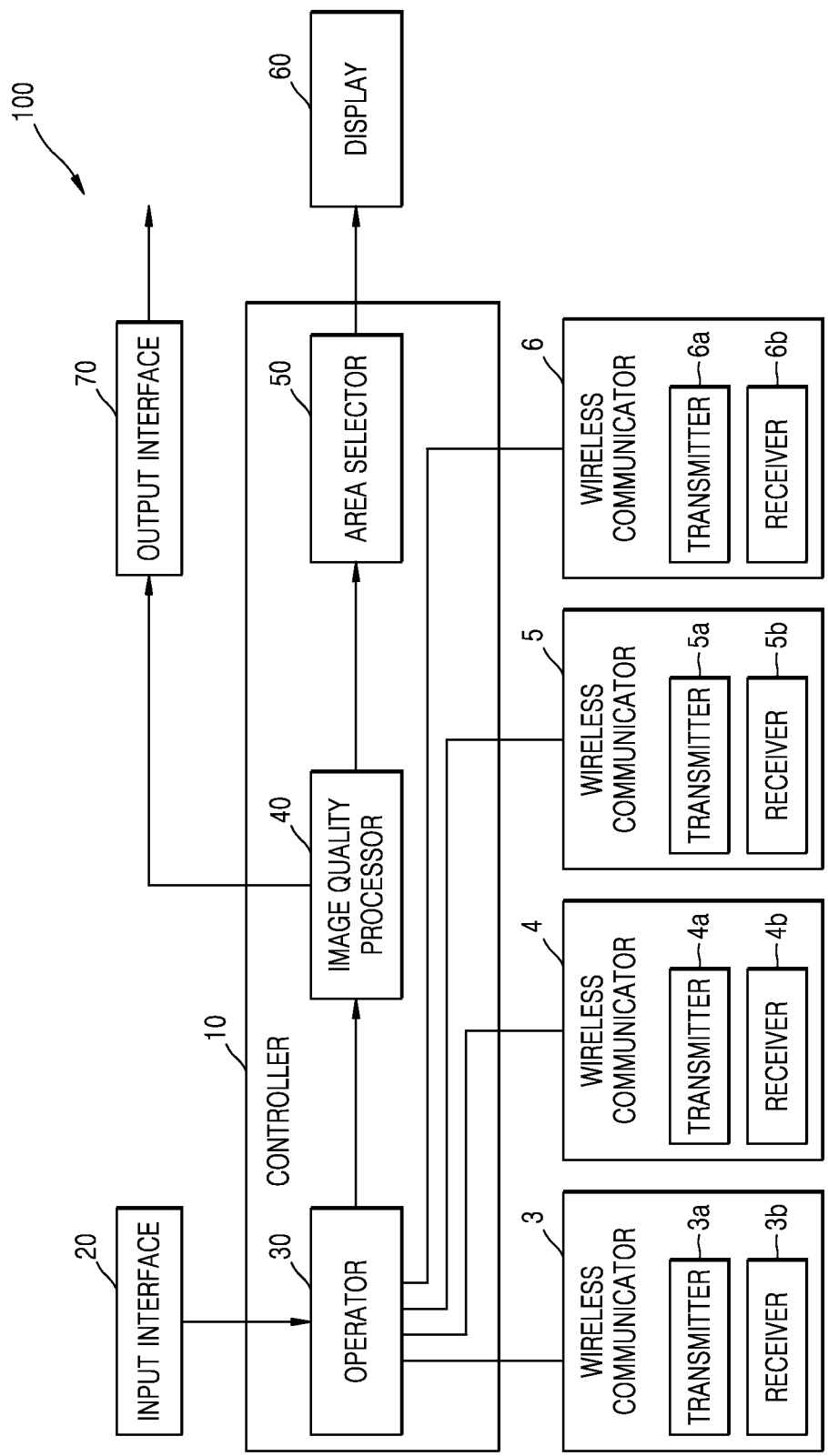
FIG. 3 is a block diagram illustrating an example configuration of a display apparatus according to an example embodiment.

FIG. 3 is a block diagram illustrating an example internal configuration of the display apparatus 100 according to an example embodiment.

Referring to FIG. 3, the display apparatus 100 may include the wireless communicators 3, 4, 5, and 6, a controller 10, an input interface (e.g., including input circuitry) 20, a display 60, and an output interface (e.g., including output circuitry) 70.

The wireless communicators 3, 4, 5, and 6 may respectively include the transmitters 3a, 4a, 5a, and 6a and the receivers 3b, 4b, 5b, and 6b, which are the same as described with reference to FIGS. 2 and 2B, and thus detailed descriptions thereof will not be repeated here.

The input interface 20 may include various input circuitry configured to receive an image signal (or data) from outside. At this time, the image signal may include a voice signal. For example, the input interface 20 may receive an image signal sent from a broadcast station, an image signal received over an Internet network, etc. To this end, the input interface 20 may include a near communication module (e.g., a wireless LAN), Wi-Fi, Bluetooth, NFC, etc.), a wired communication module (e.g., a pair cable, a co-axial cable, an optical fiber cable, etc.), a mobile communication module, etc.

The input interface 20 may also convert the image signal into a form (e.g., an analog signal may be converted into a digital signal) that may be processed in the display apparatus 100. The input interface 20 may also provide the image signal to the controller 10.

The controller 10 may include an operator 30, an image quality processor 40, and an area selector 50.

The operator 30 may include, for example, various circuitry and/or software program module(s) configured to set the reference display apparatus 109 of FIG. 1 according to a result of wireless communication through the wireless communicators 3, 4, 5, and 6. The display apparatuses 100 through 115 of FIG. 1 may have different intrinsic ID numbers. The display apparatuses 100 through 115 may transmit and receive information about their intrinsic ID numbers according to wireless communication through the wireless communicators 3, 4, 5, and 6. The operator 30 may set one of the display apparatuses 100 through 115 having, for example, a lowest intrinsic ID number as the reference display apparatus 109.

The operator 30 may also set coordinates of the display apparatus 100 by using a coordinate system of an x axis direction and a y axis direction with respect to the reference display apparatus 109. The operator 30 may also set the coordinates of the display apparatus 100 by computing which number of a display apparatus is the display apparatus 100 in the x axis direction (to the left or to the right) and in the y axis direction (to the upper side or to the lower side) from the reference display apparatus 109 from the result of wireless communication through the wireless communicators 3, 4, 5, and 6. Through the same process as described above, coordinates of the display apparatuses 100 through 115 configuring the multi display apparatus 150 may be set.

The operator 30 may also set a whole size of the multi display apparatus 150 from the coordinates of the display apparatuses 100 through 115. For example, when the multi display apparatus 150 has a grid type arrangement of 4 columns and 4 rows and a display apparatus having a lowest intrinsic ID number is set as the reference display apparatus 109 as illustrated in FIG. 1, a maximum value of x axis coordinates of the display apparatuses 100 through 115 may be 2, and a minimum value thereof may be −1. A maximum value of y axis coordinates of the display apparatuses 100 through 115 may be 2, and a minimum value thereof may be −1. The number of rows of the multi display apparatus 150 may be determined by subtracting the minimum value from the maximum value of x axis coordinates and then adding 1 thereto. The number of columns of the multi display apparatus 150 may be determined by subtracting the minimum value from the maximum value of y axis coordinates and then adding 1 thereto. As a result, the multi display apparatus 150 of FIG. 1 may be determined to have a size in which the display apparatuses 100 through 115 are aligned in 4 columns and 4 rows.

The image quality processor 40 may include, for example, various image processing circuitry and/or program module(s) configured to adjust a display property value according to a characteristic of the display 60. In this regard, the display property value may be a brightness value and a color property value necessary for displaying an image. For example, the display property value may be a value with respect to a color factor such as brightness, chroma, a color (a red (R) color value, a green (G) color value, and a blue (B) color value), etc.

Even display apparatuses including the same constituents may display colors with minute differences on their screens because the display apparatuses have different manufacturing, distribution, and use environments. Thus, to provide a clearer image signal received from outside to the display apparatus 100, the image quality processor 40 may adjust the display property of the display apparatus 100.

For example, the image quality processor 40 may simultaneously adjust the R color value, the G color value, and the B color value. In this case, the display 60 may display an image with a corrected brightness. Alternatively, the image quality processor 40 may separately adjust the R color value, the G color value, and the B color value. In this case, the display 60 may display an image with a corrected color distortion.

The image quality processor 40 may provide an image on which operations are completed to the output interface 70. The output interface 70 may include various circuitry configured to transmit the image provided by the image quality processor 40 to another display apparatus opposite to sides of the display apparatus 100.

The image quality processor 40 may also provide the image on which operations are completed to the area selector 50.

The area selector 50 may include, for example, various circuitry and/or program module(s) configured to select an area corresponding to coordinates of the display apparatus 100 from the image provided by the image quality processor 40. For example, referring to FIG. 1, the coordinates of the display apparatus 100 may be set as (−1, 2) with respect to the reference display apparatus 109. The size of the multi display apparatus 150 has 4 columns and 4 rows, and thus, the area selector 50 may select an area 1/16 the size of a whole image corresponding to the coordinates of (−1, 2) from the image provided by the image quality processor 40.

Referring to FIG. 3, the area selector 50 may provide display data corresponding to the selected area to the display 60. The display 60 may display the display data provided by the area selector 50.

Figure 4A:
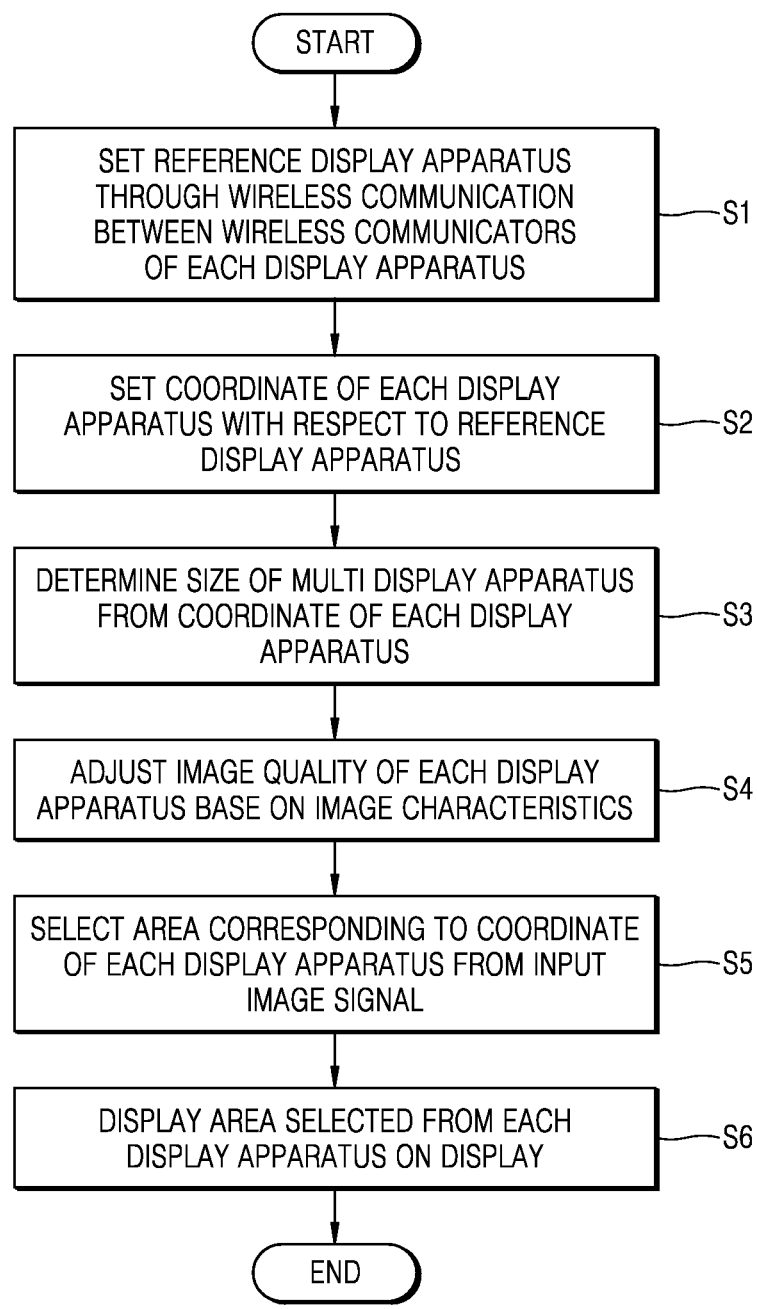
FIG. 4A is a flowchart illustrating an example image display method using a multi display apparatus according to an example embodiment.

FIG. 4A is a flowchart illustrating an example image display method using the multi display apparatus 150 according to an example embodiment.

Referring to FIG. 4A, the reference display apparatus 109 of FIG. 1 may be set through wireless communication between the wireless communicators 3, 4, 5, and 6 of FIG. 1 provided at four sides of each of the display apparatuses 100 through 115 of FIG. 1 (operation S1). The wireless communicators 3, 4, 5, and 6 may perform wireless communication by transmitting and receiving data using IR sensors.

The display apparatuses 100 through 115 may have different intrinsic ID numbers. The display apparatuses 100 through 115 may transmit and receive information about their intrinsic ID numbers according to wireless communication through the wireless communicators 3, 4, 5, and 6. One of the display apparatuses 100 through 115 having a lowest intrinsic ID number may be set as the reference display apparatus 109.

Coordinates of the display apparatuses 100 through 115 may be set with respect to the reference display apparatus 109 (operation S2). The coordinates of the display apparatuses 100 through 115 may be set by using a coordinate system of an x axis direction and a y axis direction with respect to the reference display apparatus 109. When sides of a first display apparatus and sides of a second display apparatus are opposite to each other, the coordinates of the display apparatuses 100 through 115 may be set based on location information of the first display apparatus transmitted through wireless communication and a side direction in which wireless communicators of the second display apparatus that receives the location information of the first display apparatus are arranged.

A size of the multi display apparatus 150 of FIG. 1 may be determined from the coordinates of the display apparatuses 100 through 115 (operation S3). For example, when the multi display apparatus 150 has a grid type arrangement of 4 columns and 4 rows and a display apparatus having a lowest intrinsic ID number is set as the reference display apparatus 109 as illustrated in FIG. 1, a maximum value of x axis coordinates of the display apparatuses 100 through 115 may be 2, and a minimum value thereof may be −1. A maximum value of y axis coordinates of the display apparatuses 100 through 115 may be 2, and a minimum value thereof may be −1. The number of rows of the multi display apparatus 150 may be determined by subtracting the minimum value from the maximum value of x axis coordinates and then adding 1 thereto. The number of columns of the multi display apparatus 150 may be determined by subtracting the minimum value from the maximum value of y axis coordinates and then adding 1 thereto. As a result, the multi display apparatus 150 of FIG. 1 may be determined to have a size in which the display apparatuses 100 through 115 are aligned in 4 columns and 4 rows.

An image quality may be adjusted based on characteristics of the display apparatuses 100 through 115 (operation S4). Even if the display apparatuses 100 through 115 are display apparatuses including the same constituents, the display apparatuses may display colors with minute differences on their screens because the display apparatuses have different manufacturing, distribution, and use environments. Thus, to provide a clearer image signal received from outside to each of the display apparatuses 100 through 115, display properties of the display apparatuses 100 through 115 may be adjusted.

An area corresponding to the coordinate of each of the display apparatuses 100 through 115 may be selected from the image signal input to each of the display apparatuses 100 through 115 (operation S5). For example, referring to FIG. 1, the coordinates of the display apparatus 100 may be set as (−1, 2) with respect to the reference display apparatus 109. The size of the multi display apparatus 150 has 4 columns and 4 rows, and thus, an area 1/16 the size of a whole image corresponding to the coordinates of (−1, 2) may be selected from the input image signal.

The area corresponding to the coordinates of each of the display apparatuses 100 through 115 may be displayed on each of the display apparatuses 100 through 115 (operation S6).

Figure 4B:
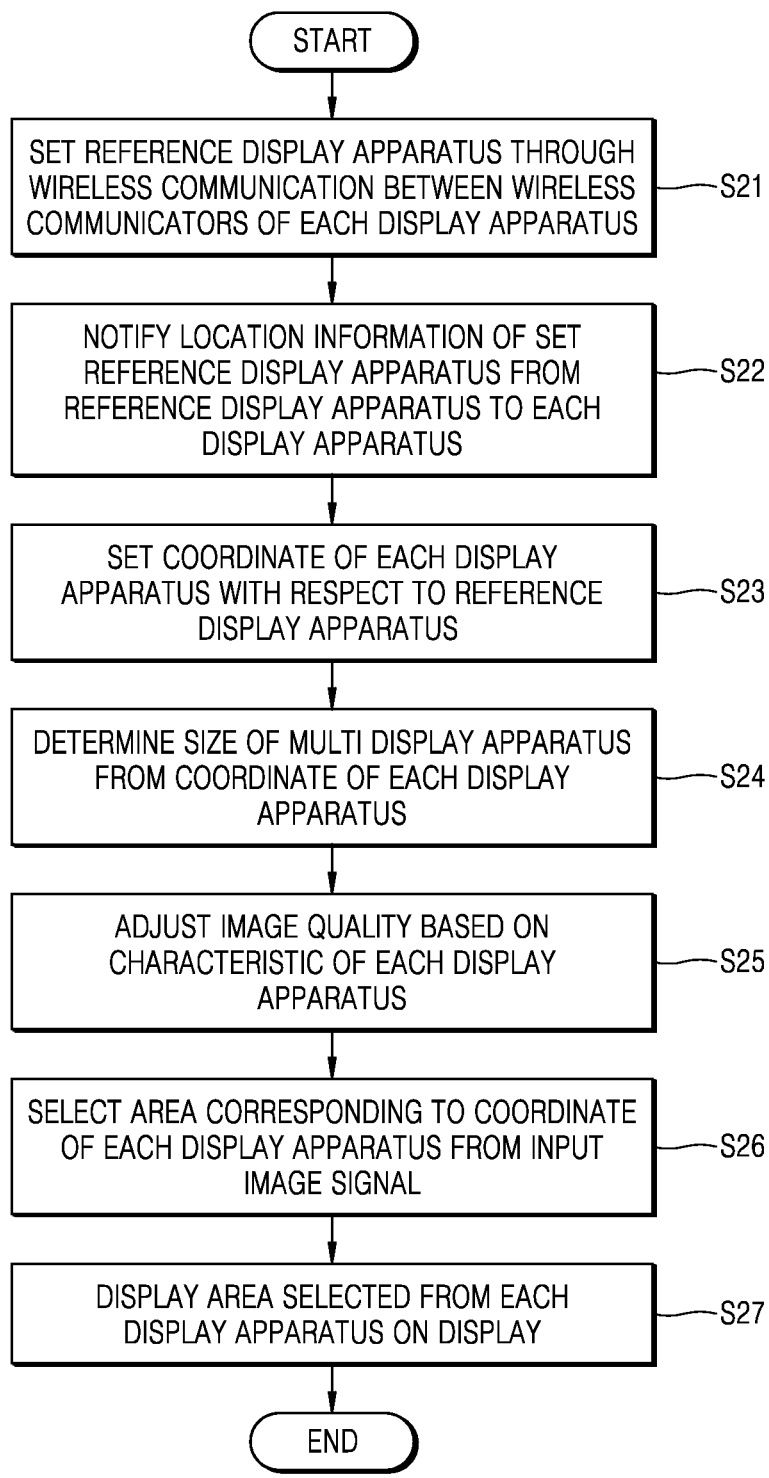
FIG. 4B is a flowchart illustrating an example image display method using a multi display apparatus according to another example embodiment.

FIG. 4B is a flowchart illustrating an example image display method using the multi display apparatus 150 according to another example embodiment.

Referring to FIG. 4B, the reference display apparatus 109 of FIG. 1 may be set through wireless communication between the wireless communicators 3, 4, 5, and 6 of FIG. 1 provided at four sides of each of the display apparatuses 100 through 115 of FIG. 1 (operation S21). The wireless communicators 3, 4, 5, and 6 may perform wireless communication by transmitting and receiving data using IR sensors.

The display apparatuses 100 through 115 may have different intrinsic ID numbers. The display apparatuses 100 through 115 may transmit and receive information about their intrinsic ID numbers according to wireless communication through the wireless communicators 3, 4, 5, and 6. One of the display apparatuses 100 through 115 having a lowest intrinsic ID number may be set as the reference display apparatus 109.

The reference display apparatus 109 may be set by each of the display apparatuses 100 through 115 after transmitting and receiving the information about their intrinsic ID numbers through wireless communication of the wireless communicators 3, 4, 5, and 6 or by the reference display apparatus 109.

When the reference display apparatus 109 may be set by the reference display apparatus 109, location information of the set reference display apparatus 109 may be notified from the reference display apparatus 109 to each of the display apparatuses 100 through 115 (operation S22). The location information of the set reference display apparatus 109 may be transmitted to each of the display apparatuses 100 through 115 through wireless communication of the wireless communicators 3, 4, 5, and 6 provided at four sides of each of the display apparatuses 100 through 115.

The display apparatuses 100 through 115 may set coordinates of the display apparatuses 100 through 115 with respect to the transmitted location information of the reference display apparatus 109 (operation S23). The coordinates of the display apparatuses 100 through 115 may be set by using a coordinate system of an x axis direction and a y axis direction with respect to the reference display apparatus 109. When sides of a first display apparatus and sides of a second display apparatus are opposite to each other, the coordinates of the display apparatuses 100 through 115 may be set based on location information of the first display apparatus transmitted through wireless communication and a side direction in which wireless communicators of the second display apparatus that receives the location information of the first display apparatus are arranged.

A size of the multi display apparatus 150 of FIG. 1 may be determined from the coordinates of the display apparatuses 100 through 115 (operation S24). For example, when the multi display apparatus 150 has a grid type arrangement of 4 columns and 4 rows and a display apparatus having a lowest intrinsic ID number is set as the reference display apparatus 109 as illustrated in FIG. 1, a maximum value of x axis coordinates of the display apparatuses 100 through 115 may be 2, and a minimum value thereof may be −1. A maximum value of y axis coordinates of the display apparatuses 100 through 115 may be 2, and a minimum value thereof may be −1. The number of rows of the multi display apparatus 150 may be determined by subtracting the minimum value from the maximum value of x axis coordinates and then adding 1 thereto. The number of columns of the multi display apparatus 150 may be determined by subtracting the minimum value from the maximum value of y axis coordinates and then adding 1 thereto. As a result, the multi display apparatus 150 of FIG. 1 may be determined to have a size in which the display apparatuses 100 through 115 are aligned in 4 columns and 4 rows.

An image quality may be adjusted based on characteristics of the display apparatuses 100 through 115 (operation S25). Even if the display apparatuses 100 through 115 are display apparatuses including the same constituents, the display apparatuses may display colors with minute differences on their screens because the display apparatuses have different manufacturing, distribution, and use environments. Thus, to provide a clearer image signal received from outside to each of the display apparatuses 100 through 115, display properties of the display apparatuses 100 through 115 may be adjusted.

An area corresponding to the coordinates of each of the display apparatuses 100 through 115 may be selected from the image signal input to each of the display apparatuses 100 through 115 (operation S26). For example, referring to FIG. 1, the coordinates of the display apparatus 100 may be set as (−1, 2) with respect to the reference display apparatus 109. The size of the multi display apparatus 150 has 4 columns and 4 rows, and thus, an area $\frac{1}{16}$ the size of a whole image corresponding to the coordinates of (−1, 2) may be selected from the input image signal.

The area corresponding to the coordinates of each of the display apparatuses 100 through 115 may be displayed on each of the display apparatuses 100 through 115 (operation S27).

In the above-described image display method according to the present disclosure, each of a plurality of display apparatuses may have a wireless communicator and a multi display apparatus may specify a coordinate of each of the display apparatuses according to a result of wireless communication, and thus the multi display apparatus may accurately and promptly display a whole screen.

Also, a large sized multi display apparatus may be configured by using a plurality of small sized display apparatuses, and thus a consumer may reduce costs for purchasing display apparatuses of the same size.

Also, a producer may concentrate on production of only display apparatuses of a uniform size, and thus production costs may be reduced.

Figure 5A:
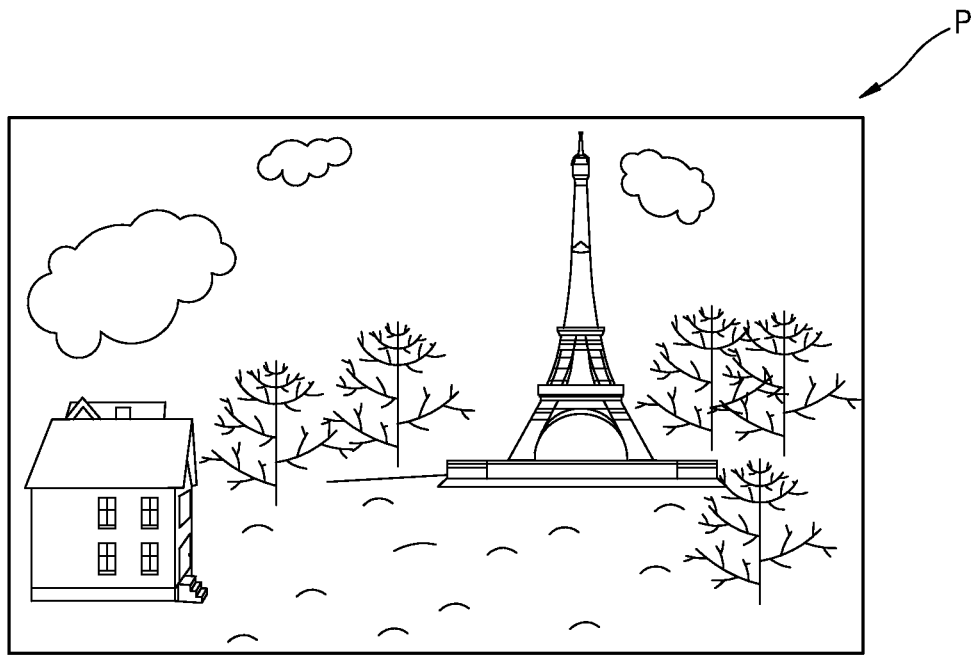
FIG. 5A is a diagram illustrating an example of a whole of a display target image.
Figure 5B:
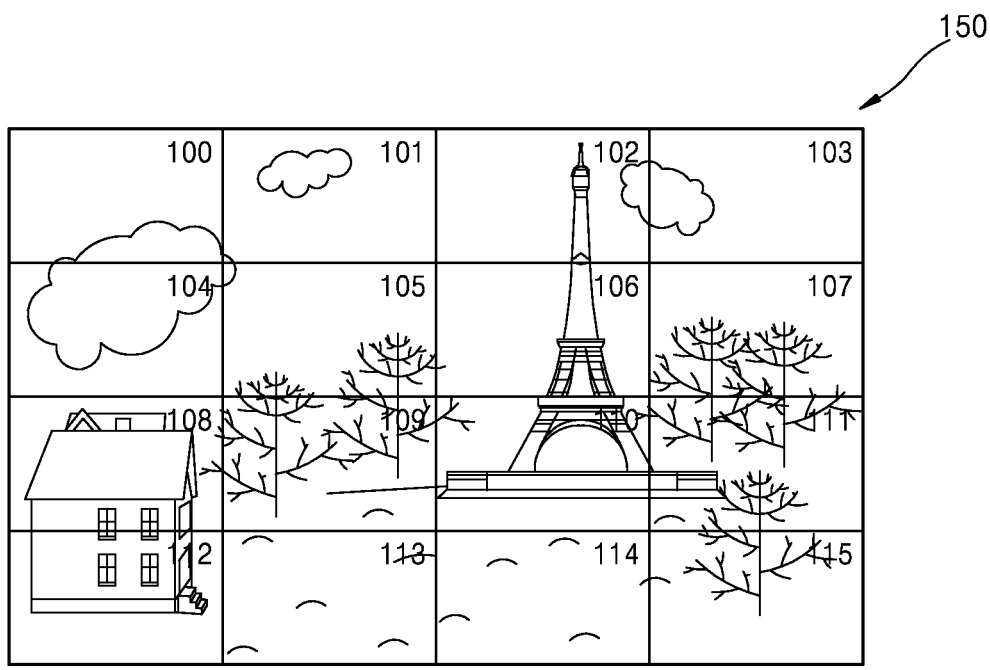
FIG. 5B is a diagram illustrating an example of a portion of a display target image displayed by each of display apparatuses.

FIG. 5A is a diagram illustrating an example of a whole of a display target image P. FIG. 5B is a diagram illustrating an example of a portion of the display target image P displayed by each of the display apparatuses 100 through 115.

Referring to FIGS. 5A and 5B, each of the display apparatuses 100 through 115 included in the multi display apparatus 150 may receive an image signal from an external apparatus (for example, a broadcast station, a contents provider, an external server, etc.). For example, the input interface 20 of FIG. 3 of each of the display apparatuses 100 through 115 may receive an analog image signal sent from the broadcast station or an encoded image signal received over an Internet network. Thereafter, each of the display apparatuses 100 through 115 may convert the analog image signal into a digital signal or may decode the encoded image signal.

The display target image P including the received image signal may be displayed on a display of each of the display apparatuses 100 through 115 after an area corresponding to each of the display apparatuses 100 through 115 is selected.

Figure 6A:
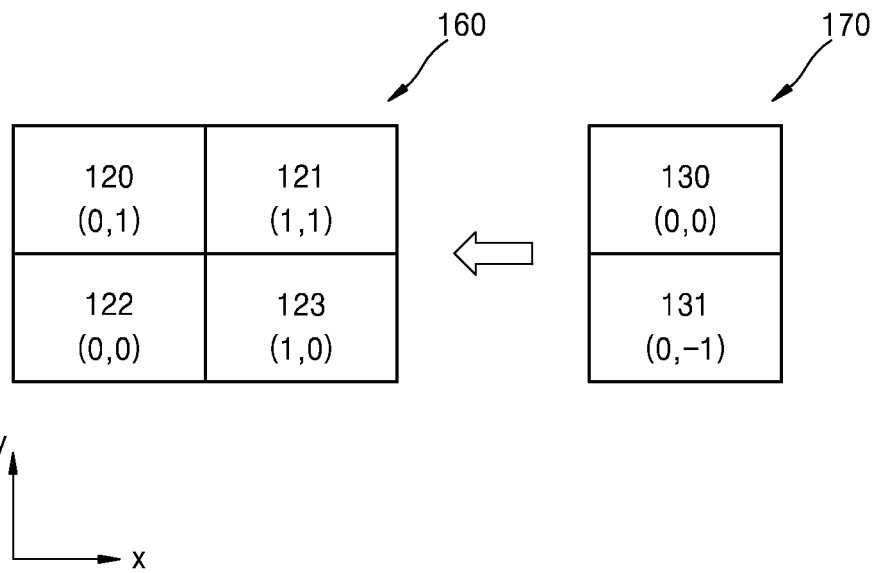
FIGS. 6A and 6B are diagrams illustrating an example third multi display apparatus resulting from combining a first multi display apparatus and a second multi display apparatus.
Figure 6B:
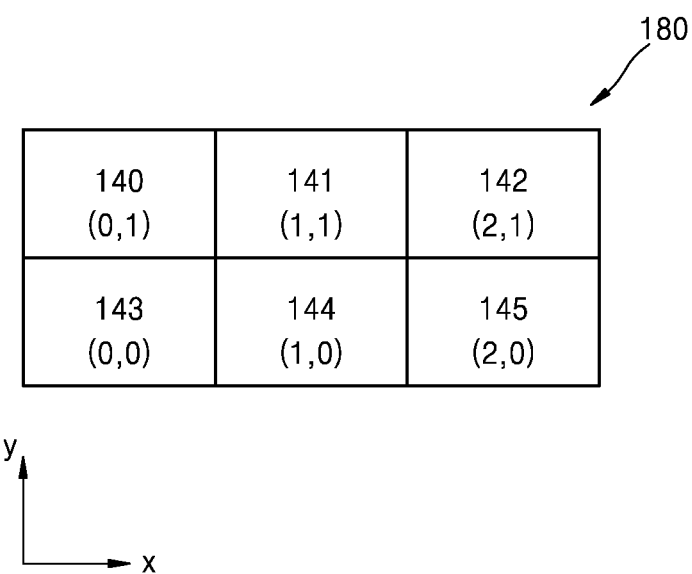

FIGS. 6A and 6B are diagrams illustrating an example third multi display apparatus 180 configured by combining a first multi display apparatus 160 and a second multi display apparatus 170.

Referring to FIG. 6A, the first multi display apparatus 160 and the second multi display apparatus 170 may independently receive respective image signals and display respective images. The first multi display apparatus 160 may select and display an area corresponding to a coordinate of each of display apparatuses 120 through 123 from the received image signal with respect to a first reference display apparatus 122. The second multi display apparatus 170 may select and display an area corresponding to a coordinate of each of display apparatuses 130 and 131 from the received image signal with respect to a second reference display apparatus 130.

Referring to FIG. 6B, the first multi display apparatus 160 and the second multi display apparatus 170 may be combined with each other to form a third multi display apparatus 180. The third multi display apparatus 180 may select and display an area corresponding to a coordinate of each of display apparatuses 140 through 145 from a received image signal with respect to a third reference display apparatus 143.

Figure 6C:
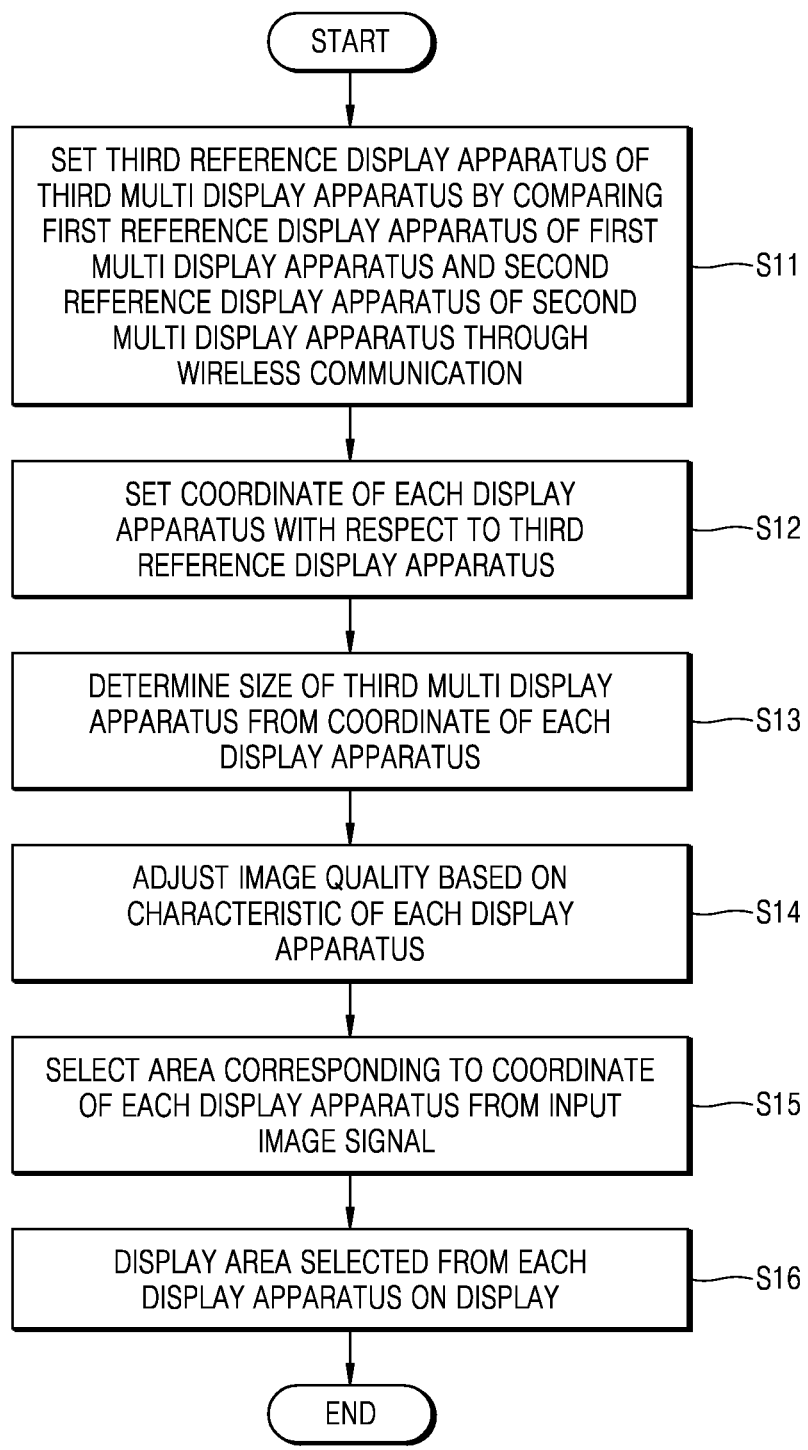
FIG. 6C is a flowchart illustrating an example image display method when a third multi display apparatus resulting from combining a first multi display apparatus and a second multi display apparatus.

FIG. 6C is a flowchart illustrating an example image display method when the third multi display apparatus 180 is configured by combining the first multi display apparatus 160 and the second multi display apparatus 170.

Referring to FIG. 6C, when the first multi display apparatus 160 and the second multi display apparatus 170 are combined with each other, through wireless communication between wireless communicators provided sides of the first multi display apparatus 160 and the second multi display apparatus 170, the third reference display apparatus 143 of the third multi display apparatus 180 may be set by comparing the first reference display apparatus 122 of the first multi display apparatus 160 and the second reference display apparatus 130 of the second multi display apparatus 170 (operation S11).

In connection with setting of the third reference display apparatus 143, a display apparatus having a lower intrinsic ID number may be set as the third reference display apparatus 143 by comparing intrinsic ID numbers of the first reference display apparatus 122 and the second reference display apparatus 130.

Coordinates of the display apparatuses 140 through 145 may be set with respect to the third reference display apparatus 143 (operation S12). The coordinates of the display apparatuses 140 through 145 may be set by using a coordinate system of an x axis direction and a y axis direction with respect to the third reference display apparatus 143. When sides of a first display apparatus and sides of a second display apparatus are opposite to each other, the coordinates of the display apparatuses 140 through 145 may be set based on location information of the first display apparatus transmitted through wireless communication and a side direction in which wireless communicators of the second display apparatus that receives the location information of the first display apparatus are arranged.

A size of the third multi display apparatus 180 may be determined from the coordinates of the display apparatuses 140 through 145 (operation S13). For example, when the third multi display apparatus 180 has a grid type arrangement of 3 columns and 2 rows and a display apparatus having a lowest intrinsic ID number is set as the third reference display apparatus 143 as illustrated in FIG. 6B, a maximum value of x axis coordinates of the display apparatuses 140 through 145 may be 2, and a minimum value thereof may be 0. A maximum value of y axis coordinates of the display apparatuses 140 through 145 may be 1, and a minimum value thereof may be 0. The number of rows of the third multi display apparatus 180 may be determined by subtracting the minimum value from the maximum value of x axis coordinates and then adding 1 thereto. The number of columns of the third multi display apparatus 180 may be determined by subtracting the minimum value from the maximum value of y axis coordinates and then adding 1 thereto. As a result, the third multi display apparatus 180 of FIG. 6B may be determined to have a size in which the display apparatuses 140 through 145 are aligned in 3 columns and 2 rows.

An image quality may be adjusted based on characteristics of the display apparatuses 140 through 145 (operation S14). Even if the display apparatuses 140 through 145 are display apparatuses including the same constituents, the display apparatuses may display colors with minute differences on their screens because the display apparatuses have different manufacturing, distribution, and use environments. Thus, to provide a clearer image signal received from outside to each of the display apparatuses 140 through 145, display properties of the display apparatuses 140 through 145 may be adjusted.

An area corresponding to the coordinate of each of the display apparatuses 140 through 145 may be selected from the image signal input to each of the display apparatuses 140 through 145 (operation S15). For example, referring to FIG. 6B, the coordinate of the display apparatus 140 may be set as (0, 1) with respect to the third reference display apparatus 143. The size of the third multi display apparatus 180 has 3 columns and 2 rows, and thus an area of ⅙ a whole image corresponding to the coordinate of (0, 1) from the input image signal.

The area corresponding to the coordinate of each of the display apparatuses 140 through 145 may be displayed on each of the display apparatuses 140 through 145 (operation S16).

In the above-described image display method according to the present disclosure, when a plurality of multi display apparatuses are combined with each other, coordinates of a plurality of display apparatuses included in one combined multi display apparatus may be specified through wireless communication of a wireless communicator included in each of the multi display apparatuses, and thus the one combined multi display apparatus may accurately and promptly display a whole screen.

Figure 7A:
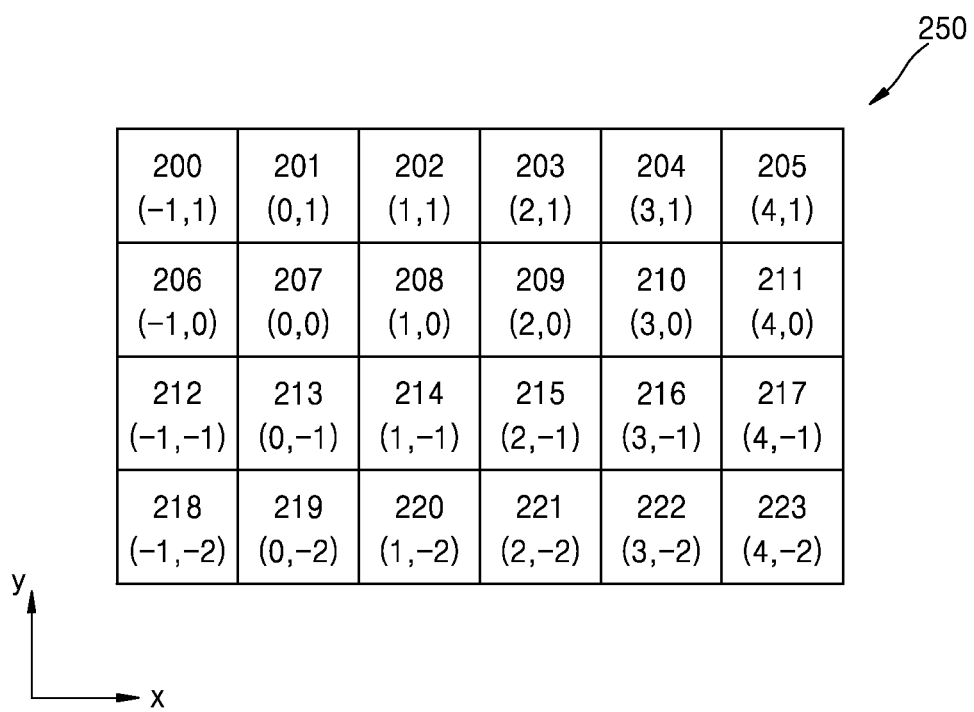
FIGS. 7A, 7B and 7C are diagrams illustrating an example change of a multi display apparatus to another multi display apparatus in which a plurality of display apparatuses are differently arranged through mechanical driving according to another example embodiment.
Figure 7B:
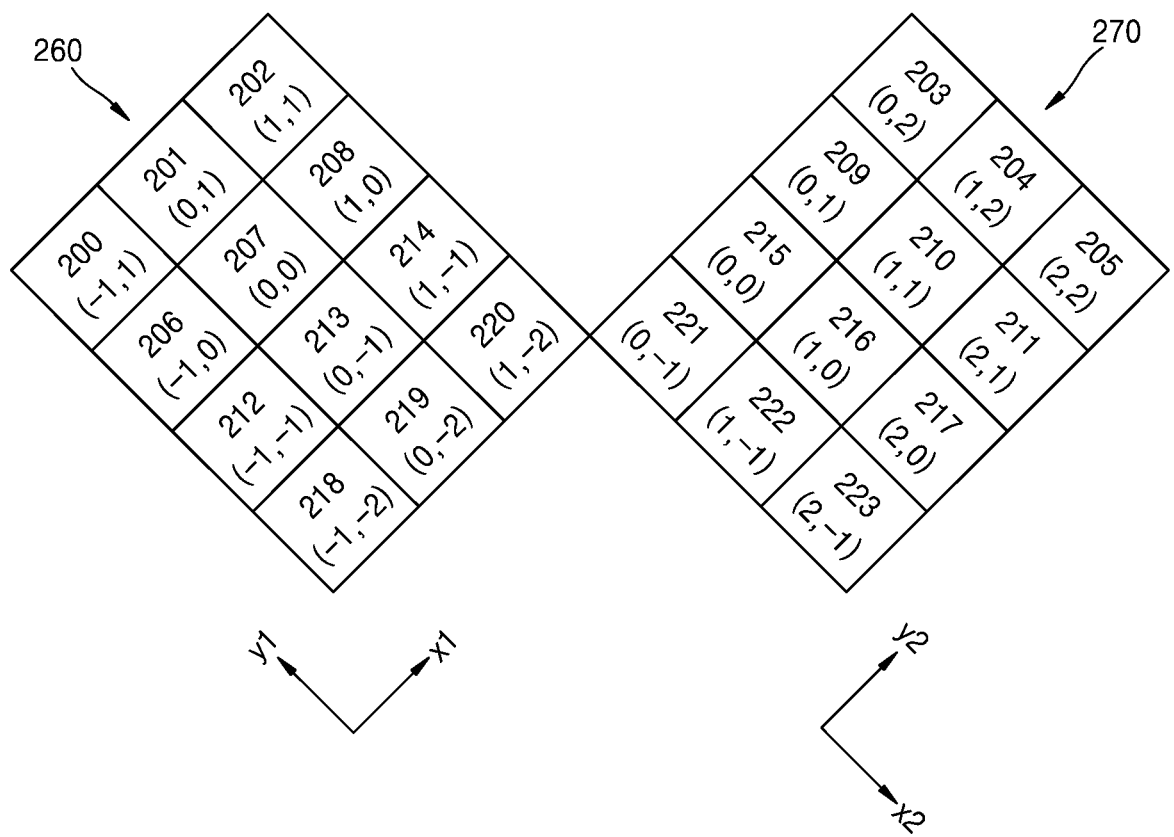
Figure 7C:
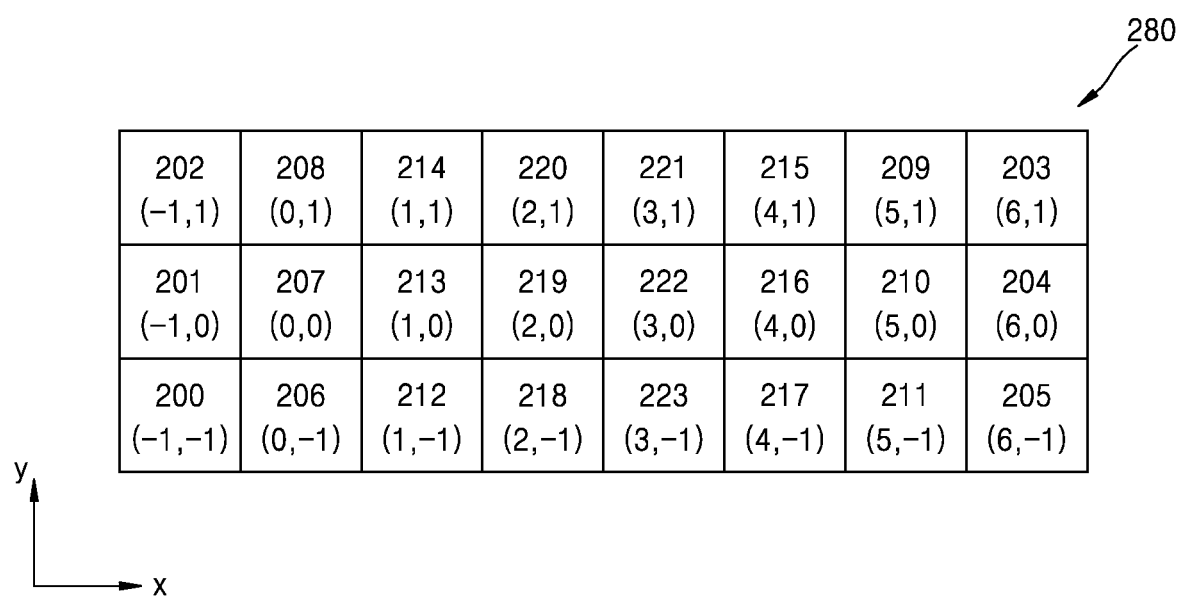

FIGS. 7A through 7C are diagrams illustrating an example change of a multi display apparatus 250 to another multi display apparatus 280 in which a plurality of display apparatuses 200 through 223 are differently arranged through mechanical driving according to another example embodiment.

Referring to FIG. 7A, the multi display apparatus 250 may include the plurality of display apparatuses 200 through 223 in a grid type arrangement of 6 columns and 4 rows. The display apparatuses 200 through 223 may output one image or a plurality of images.

In the multi display apparatus 250, a coordinate of each of the display apparatuses 200 through 223, using a coordinate system of an x axis direction (a horizontal direction) and a y axis direction (a vertical direction) with respect to a reference display apparatus 207, indicates a location of each of the display apparatuses 200 through 223. (x,y)=(0,0) may be a coordinate value of the reference display apparatus 207. The coordinate of each of the display apparatuses 200 through 223 may be set with respect to (x,y)=(0,0). Also, each of each of the display apparatuses 200 through 223 may select and display an area corresponding to its coordinate, and accordingly, the multi display apparatus 250 may display an input image signal as a whole. An image display method using the multi display apparatus 250 is the same as described above, and thus a description thereof will not be repeated here.

Referring to FIG. 7B, the multi display apparatus 250 of FIG. 7A may be separated into a first multi display apparatus 260 and a second multi display apparatus 270 through, for example, mechanical driving of a frame in which the display apparatuses 200 through 223 are mounted.

If the first multi display apparatus 260 and the second multi display apparatus 270 of the multi display apparatus 250 of FIG. 7A are spaced apart from each other by more than a predetermined distance through mechanical driving, a wireless communicator of the first multi display apparatus 260 and a wireless communicator of the second multi display apparatus 270 may detect through wireless communication that the first multi display apparatus 260 and the second multi display apparatus 270 are spaced apart from each other.

In this regard, since the first multi display apparatus 260 and the second multi display apparatus 270 configure different multi display apparatuses, different reference display apparatuses may be set with respect to the first multi display apparatus 260 and the second multi display apparatus 270. For example, among a plurality of display apparatuses configuring the first multi display apparatus 260, a display apparatus having a lowest intrinsic ID number may be set as the reference display apparatus 207, and, among a plurality of display apparatuses configuring the second multi display apparatus 270, a display apparatus having a lowest intrinsic ID number may be set as a reference display apparatus 215. A coordinate of each of the plurality of display apparatuses configuring the first multi display apparatus 260 may be set by using a coordinate system of an x1 axis direction and an y1 axis direction with respect to the reference display apparatus 207. A coordinate of each of the plurality of display apparatuses configuring the second multi display apparatus 270 may be set by using a coordinate system of an x2 axis direction and an y2 axis direction with respect to the reference display apparatus 215.

After the reference display apparatuses 207 and 215 are set, each of the plurality of display apparatuses configuring the first multi display apparatus 260 may select and display an area corresponding to its coordinate, and accordingly, the first multi display apparatus 260 may display an input image signal as a whole. Also, each of the plurality of display apparatuses configuring the second multi display apparatus 270 may select and display an area corresponding to its coordinate, and accordingly, the second multi display apparatus 270 may display an input image signal as a whole. An image display method using the first and second multi display apparatuses 260 and 270 is the same as described above, and thus a description thereof will not be repeated here.

Referring to FIG. 7C, the first multi display apparatus 260 and the second multi display apparatus 270 may configure the multi display apparatus 280 in which the display apparatuses 200 through 223 are arranged differently from the multi display apparatus 250 FIG. 7A, through, for example, mechanical driving of a frame in which the display apparatuses 200 through 223 are mounted.

If the first multi display apparatus 260 and the second multi display apparatus 270 of FIG. 7B are close to each other more than a predetermined distance through mechanical driving, a wireless communicator of the first multi display apparatus 260 and a wireless communicator of the second multi display apparatus 270 may detect through wireless communication that the first multi display apparatus 260 and the second multi display apparatus 270 are close to each other.

In this regard, since the first multi display apparatus 260 and the second multi display apparatus 270 configure the one multi display apparatus 280, the one reference display apparatus 207 may be set again with respect to the first multi display apparatus 260 and the second multi display apparatus 270. For example, among a plurality of display apparatuses configuring the multi display apparatus 280, a display apparatus having a lowest intrinsic ID number may be set as the reference display apparatus 207. A coordinate of each of the plurality of display apparatuses configuring the multi display apparatus 280 may be set by using a coordinate system of an x axis direction and a y axis direction with respect to the reference display apparatus 207.

After the reference display apparatus 207 is set, each of the plurality of display apparatuses configuring the multi display apparatus 280 may select and display an area corresponding to its coordinate, and accordingly, the multi display apparatus 280 may display an input image signal as a whole.

According to the above-described embodiments, each of a plurality of display apparatuses may have a wireless communicator and a multi display apparatus may specify a location (coordinate) of each of the display apparatuses according to a result of wireless communication, and thus the multi display apparatus may accurately and promptly display a whole screen.

Also, a large sized multi display apparatus may be configured using a plurality of small sized display apparatuses, and thus a consumer may reduce costs for purchasing display apparatuses of the same size.

Also, a producer may concentrate on production of only display apparatuses of a uniform size, and thus production costs may be reduced.

The various example embodiments are examples, and thus, it will be understood by those of ordinary skill in the art that various changes in form and details may be made therein without departing from the spirit and scope of the disclosure. Therefore, the example embodiments should be considered in descriptive sense only and not for purposes of limitation. For example, each constituent element that is described as a singular form may be embodied in distribution forms. Also, constituent elements that are described in distribution forms may be embodied in a combined form.

It should be understood that the various example embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A display apparatus for a multi display apparatus that comprises a plurality of display apparatuses each comprising a respective display, the display apparatus comprising:
an input interface comprising input circuitry configured to receive an image signal corresponding to an image;
wireless communicators each comprising wireless communication circuitry and provided at four sides of the display apparatus;
a controller configured to:
set one of the plurality of display apparatuses as a reference display apparatus for the plurality of display apparatuses based on identification information of the plurality of display apparatuses received through the wireless communication circuitry of the respective wireless communicators at each of the four sides of the display apparatus set as the reference display apparatus, the reference display apparatus surrounded by a respective display apparatus of the plurality of display apparatuses on each of the four sides of the reference display apparatus, set coordinates of the display apparatus within the multi display apparatus based on the set reference display apparatus, determine a size of the multi display apparatus, select an area within the image corresponding to the coordinates of the display apparatus from the image signal; and cause a display of the display apparatus to display the selected area.

2. The display apparatus of claim 1, wherein each of the wireless communicators comprises an infrared sensor.

3. The display apparatus of claim 1, wherein each of the wireless communicators comprises a transmitter and a receiver.

4. The display apparatus of claim 1, further comprising: an image quality processor configured to adjust an image quality based on a characteristic of at least one of the display apparatuses.

5. The display apparatus of claim 1, further comprising: an output interface comprising output circuitry configured to transmit the image signal to another display apparatus.

6. The display apparatus of claim 1, wherein the controller is further configured to set coordinates of the display apparatus using a coordinate system comprising a horizontal direction and a vertical direction with respect to the reference display apparatus.

7. The display apparatus of claim 6, wherein the controller is further configured to determine the size of the multi display apparatus from coordinates of the plurality of display apparatuses.

8. A method of displaying an image performed using a multi display apparatus that comprises a plurality of display apparatuses each comprising a respective display, the method comprising:

setting one of the display apparatuses as a reference display apparatus for the plurality of display apparatuses through wireless communication between wireless communicators comprising wireless communication circuitry provided at four sides of at least one of the plurality of display apparatuses set as the reference display apparatus, the reference display apparatus surrounded by a respective display apparatus of the plurality of display apparatuses on each of the four sides of the reference display apparatus;

setting coordinates of each of the plurality of display apparatuses within the multi display apparatus with respect to the reference display apparatus;

determining a size of the multi display apparatus;

selecting an area within an image corresponding to the coordinates from an image signal input to each of the plurality of display apparatuses; and displaying each selected area on a display of the respective plurality of display apparatuses, wherein the setting the reference display apparatus comprises: setting one of the plurality of display apparatuses as the reference display based on identification information of the plurality of display apparatuses received through the wireless communication circuitry of the wireless communicators.

9. The method of claim 8, further comprising: after setting the reference display apparatus, notifying others of the plurality of display apparatuses of location information of the reference display apparatus.

10. The method of claim 8, further comprising: adjusting an image quality based on characteristics of the plurality of display apparatuses.

11. The method of claim 8, wherein the wireless communicators perform wireless communication by transmitting and receiving data using infrared sensors.

12. The method of claim 8, wherein the setting the coordinates of each of the plurality of display apparatuses comprises: setting the coordinates based on location information of a first display apparatus transmitted through wireless communication and a side direction in which wireless communicators of a second display apparatus that receive the location information of the first display apparatus are arranged.

13. The method of claim 12, wherein the determining the size of the multi display apparatus comprises: determining the size using a maximum value and a minimum value of horizontal direction coordinates of the plurality of display apparatuses and a maximum value and a minimum value of vertical direction coordinates of the plurality of display apparatuses, with respect to the reference display apparatus.

14. An image display method performed using a third multi display apparatus comprising a first multi display apparatus and a second multi display apparatus, the method comprising:

setting a reference display apparatus of the third multi display apparatus through wireless communication between wireless communicators, each comprising wireless communication circuitry, provided at sides of the first multi display apparatus and the second multi display apparatus;

setting coordinates of each of a plurality of display apparatuses, each comprising a respective display, included in the third multi display apparatus with respect to the reference display apparatus based on the set reference display apparatus;

determining a size of the third multi display apparatus from the coordinates of each of the plurality of display apparatuses;

selecting an area within the image corresponding to the coordinates from an image signal input to each of the plurality of display apparatuses; and displaying the each selected area on a display of the respective plurality of display apparatuses, wherein the setting the reference display apparatus comprises: setting the reference display apparatus of the third multi display apparatus by comparing a first reference display apparatus of the first multi display apparatus and a second reference display apparatus of the second multi display apparatus, wherein a display apparatus is set as the reference display apparatus based on identification information of the first multi display apparatus and the second multi display apparatus.

15. The method of claim 14, further comprising: adjusting an image quality based on characteristics of the plurality of display apparatuses.

16. The display apparatus of claim 1, wherein the wireless communicators are arranged in center portions of the four sides.

* * * * *